Patented Dec. 1, 1953

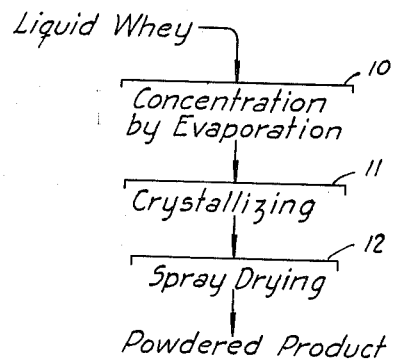
FIG_1_
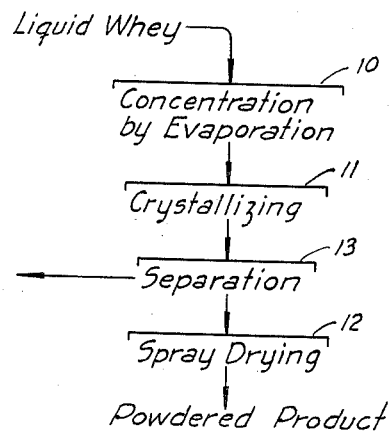
FIG_2_

2,661,294

UNITED STATES PATENT OFFICE 2,661,294

METHOD OF DRYING LACTEAL FLUIDS

Reginald E. Meade, Appleton, Wis., assignor to Western Condensing Company, San Francisco, Calif., a corporation of California Application July 9, 1949, Serial No. 103,857

8 Claims. (Cl. 99—56)

This invention relates generally to processes for the treatment of liquid lacteal materials containing substantial amounts of lactose, and to powdered products resulting from such processes.

It is well known that when a liquid lacteal material high in lactose content, such as commercial whey is spray dried to form an anhydrous powder, the resulting product is relatively unstable and hygroscopic. Because an anhydrous hygroscopic powder of this kind is unsuitable for ordinary commercial purposes, several processes have been developed for the purpose of converting such lacteal material into stabilized nonhygroscopic powder, having its lactose content in the form of a monohydrate of alpha lactose. One process of this character is disclosed in Simmons Patent 1,763,633, and involves concentrating raw liquid whey, permitting the concentrate to set to enable the lactose to crystallize in the form of relatively large or coarse crystals of alpha lactose monohydrate, granulating this material by forcing it through screens, removing excess moisture by drying, and then finally grinding the material to form a powder. This process has several recognized disadvantages. It is applicable primarily to material like commercial whey, resulting from the manufacture of cheese or casein. The material is under treatment for an extended period of time, and milk protein is in contact with concentrated mineral salt solution for a substantial period of time prior to formation of the final powder. This results in a detrimental salting out effect on the milk protein. In addition extensive equipment and handling is required in carrying out the process, which contributes to the cost of the final product.

A simpler commercial method for the production of stabilized powdered whey is disclosed in Peebles et al. 2,088,606. According to the Peebles et al. process, liquid whey is concentrated by evaporation to form a super-saturated concentrate substantially free of lactose crystals. This concentrate is then supplied to a spray drier which is operated within a critical range of temperatures. The spray drier directly produces a moist friable powder containing from 12 to 14% free moisture, which is then treated to secondary drying and crushing to form a final stabilized material.

The process of Peebles et al. 2,088,606 is superior to the Simmons process, but is likewise subject to certain disadvantages. The relatively critical temperature requirements involve some operating difficulties, and shut down periods for cleaning out accumulations of material in the interior of the dessicating chamber are of relative common occurrences. Also the powder leaving the spray drier has sufficient free moisture that some salting out action occurs to the detriment of the protein content. The necessity of using a finishing drier adds considerably to the cost of the process.

In general it is an object of the present invention to provide a new and improved process for the production of stable nonhygroscopic powdered products from lacteal materials containing substantial amounts of lactose.

Another object of the invention, in its preferred form, is to provide a process which will avoid the necessity of using a finishing drier as disclosed in Peebles et al. 2,088,606.

Another object of the invention, in its preferred form, is to provide new powdered lacteal products resulting from my process, which have their lactose in stable crystallized form, and which have properties distinguishing them from powdered products such as have been produced in the past. In particular, products made according to my process are characterized by protein which has not been detrimentally affected by a salting out action, and by the fact that there is less physical attachment between the crystals of lactose, and the other milk solids. My milk products can be readily re-dispersed in water, they are highly palatable and the protein content is in readily digestible form.

Additional objects and features of the invention will appear from the following description in which the preferred embodiments of the invention have been set forth in detail in conjunction with the accompanying drawing.

Referring to the drawing:

Figure 1 is a flow diagram illustrating one manner of carrying out the present process.

Figure 2 is another flow diagram illustrating a modification of the process.

In general the present invention involves concentrating lacteal material by conventional evaporation, thereby producing a concentrate suitable for further treatment. The next step is to cause crystallization of lactose in the concentrate, with formation of relatively small sized crystals, thereby producing a concentrate having at least about 50% of its lactose content in stable crystallized form. This material, with the crystals in suspension, is then spray dried to form a powder. Preferably as much as about 70% or more of the lactose is crystallized in the concentrate, and the spray drying of such concentrate is controlled whereby the free moisture content in the final product is insufficient to require secondary drying. The advantages of this process, and the new characteristics of the final products produced, will be presently described in detail.

A better understanding of the process can be had by reference to the flow diagram of Figure 1. Assuming that the lacteal material being treated is whey, I may employ commercial liquid whey such as is formed as a by-product in the manufacture of cheese from milk, or as formed in the commercial manufacture of casein. The character of commercial whey varies considerably in accordance with the treatment to which it has been subjected. Typical analyses of commercial wheys show water content ranging from 93 to 94%, solids from 6.0 to 7.0% fat from 0.3 to 0.1%, lactose from 4.00 to 5.25%, ash from 0.4 to 0.8% and acid (as lactic) from 0.11 to 0.50%.

In the flow diagram of Figure 1 the raw liquid whey is shown being supplied to the concentrating operation 10, where it is concentrated by evaporation. Vacuum evaporating equipment can be used such as will deliver a concentrate of the order of 50 to 60% solids. The temperature of the concentrate as delivered from the last evaporating stage will vary in accordance with the vacuum employed, but in a typical instance it will be of the order of from 110 to 150° F., and the lactose content of the concentrate will be in solution.

In the next step 11 of the process, the concentrate is subjected to crystallization under such conditions as to cause the bulk of the lactose content to crystallize out in the form of small crystals of alpha lactose monohydrate. This operation can be carried out in a suitable tank provided with means for gradually cooling a batch of the concentrate. The tank should be provided with suitable agitating means for maintaining continuous agitation. As cooling proceeds the lactose crystallizes out with progressive release of water of solution, and with the small crystals remaining in suspension. In a typical instance crystallization is continued until at least about 50% and preferably more of the lactose has been crystallized, leaving the remaining minor percentage in solution. The size of the crystals will vary for a given batch of material and for different conditions of treatment, such as differences in concentration, rate and extent of cooling. In typical instances the bulk of the crystals have ranged from 0.015 to 0.06 inch on the long axis.

It has been found desirable to control the rate of cooling in such a manner that it is comparable to the rate of crystal formation. In practice cooling of a whey concentrate containing from 50 to 60% solids, from an initial temperature of about 130° F., has been extended over a period of from 24 to 36 hours, to a final temperature of the order of 25° F. Such treatment has served to crystallize 75% or more of the lactose content.

In the crystallizing operation as described above, it is not necessary to initially seed crystal formation. However seeding serves to accelerate crystal formation and can be carried out by introducing small amounts of a stabilized whey powder into the concentrate while the same is being cooled. It is convenient to use stabilized dried whey powder such as is produced by the present process, and which has its lactose content in the form of alpha lactose monohydrate. Seeding can be limited to the initial stages of crystallization, but may also be employed throughout cooling.

Assuming that the whey concentrate has been crystallized whereby at least about 50% or more of the lactose content is in the form of small crystals of lactose monohydrate in suspension, this slurry is then supplied to the spray drying operation 12, where it is atomized in contact with hot drying air. Conventional spray drying equipment can be used for this operation, although it is preferable to utilize a centrifugal type of atomizer such as will handle the concentrate. The flow rate of drying air through the desiccating chamber, together with the inlet and outlet temperatures of the air, should be adjusted in order to avoid removal of water of crystallization from the lactose crystals, while at the same time reducing the free moisture content of the material to produce a final powdered product of the desired consistency.

It is possible to spray dry to a free moisture content considerably in excess of that desired in the final product, say from 12 to 16%, followed by secondary drying. It has been noted however that an increase in the percentage of lactose in crystallized form, before spray drying, facilitates and makes possible a reduction in the free moisture content of the initially spray dried powder. Thus when about 70% or more of lactose is crystallized before spray drying, the free moisture content of the spray dried powder can be reduced to amounts of the order of 4 to 5%. Direct spray drying to a powder having a low free moisture content is desirable and advantageous because it permits elimination of secondary drying. Thus whey powder produced in this fashion can be directly sacked for marketing, without conventional crushing after drying. Any lumps in the material as initially removed from the spray drier slake out within a few hours, to form a friable material which crushes under light pressure to form a free flowing powder.

Whey powder produced by the present process possesses many properties which distinguish it from conventional stabilized whey powder. The lactose crystals formed in the crystallizing operation 11 retain their identity in the spray drying operation 12, and appear as such in the final powdered material. Upon a microscopic examination of the powdered product these crystals of lactose monohydrate are readily identifiable. In general the crystallized particles are relatively free of attachment to dried milk protein. In other words the lactose crystals are not nuclei for agglomerated particles of dried milk protein, but appear as distinct particles in the powder. In carrying out the process of Peebles et al. 2,088,606, wherein crystallization is carried out simultaneously with spray drying, the lactose crystals in the final product become attached to or coated with particles of dried protein, and this has the effect of making such powder more difficult to redisperse in water. The present product readily redisperses in water, which is attributed to the fact that the lactose crystals are not coated with dried protein, and therefore are more readily placed in solution.

Assuming that about 70% or more of the lactose is crystallized before spray drying, and the spray drying operation is carried out to provide a low free moisture content in the powder, the protein content of the final product is not deteriorated by a salting out effect such as previously described. This is because the moisture content of the material as delivered by the spray drier is so low that there is insufficient free moisture for any detrimental effect of the mineral salts upon the protein. This serves to form a whey powder of greater palatability, which can be more readily dispersed in water, and which has its protein in more digestible form.

Although I prefer to carry out crystallization to the extent of crystallizing about 70% or more of the lactose, substantial benefits of the present process can be obtained when crystallization is carried out to the extent of causing crystallization of from about 50 to 70% of the lactose content. Crystallization to the extent of say 50% of the lactose facilitates spray drying to form a stabilized whey powder.

However as previously explained when less than about 70% of the lactose is crystallized before spray drying, a larger amount of free moisture is left in the spray dried powdered product, and this necessitates secondary drying and crushing, to produce a final material which is relatively stable, and which has a free moisture content of the order of from 2.5 to 6%.

As illustrated in the flow diagram of Figure 2, it is possible to modify the final powdered product by removing a part of the liquid content after crystallization. Thus following crystallization of the concentrate at 11, this material is subjected to a separating operation 12, for the purpose of removing a predetermined amount of the supernatant liquid. This separating operation can be conveniently carried out by centrifuging, whereby a supernatant liquid fraction is removed in the overflow, and the remaining material, together with the lactose crystals, is removed as an underflow slurry. The underflow is then subjected to spray drying as indicated, with the addition of fresh water, if necessary, to increase fluidity of the underflow for proper atomization.

The final product obtained from the process as carried out in Figure 2 has a relatively high lactose content, and a reduced content of mineral salts, because of the removal of a substantial part of such salts in the supernatant liquid. It will be evident that the supernatant liquid removed in separating operation 13 can be separately treated in any manner desired, as for example by separate spray drying.

An example of actual practice is as follows: Commercial liquid whey was concentrated by vacuum evaporation to produce a final concentrate containing 60% solids, at a temperature of about 130° F. A quantity of this concentrate was then placed in a cooling tank equipped with an agitator, and with a cooling jacket. In this tank the concentrate was cooled gradually over a period of 24 hours with continual agitation, and to a final temperature of about 25° F. At the end of this crystallizing operation about 75% of the lactose was in the form of small crystals of lactose monohydrate. The concentrate was of creamy white consistency, and the lactose crystals could be felt between the fingers as fine gritty particles. This concentrate was then supplied to a spray drier equipped with a centrifugal atomizing nozzle. The desiccator was operated to produce a powder having a free moisture content of about 5%. The powder as removed from the desiccator had a few lumps but after being permitted to stand for a few hours, the cool material crushed under slight pressure to form a free flowing powder.

Another example is as follows: Commercial liquid whey was concentrated by vacuum evaporation to 51.2% solids and then slowly cooled to 46° F. About 62.0% of the total lactose content was crystallized. The concentrate was then spray dried to a powder having 12.27% free moisture. More than 90% of the lactose of this rough dried powder was hydrated. The powder was then subjected to secondary or finishing drying to provide a stable powder having a free moisture of about 2.6%.

In the foregoing description of my process the invention has been described as applied to the treatment of commercial liquid whey. However the process is deemed applicable to other liquid lacteal materials containing substantial amounts of lactose and milk protein, such as skim milk.

Reference is made to co-pending application filed simultaneously herewith and entitled "Process and Apparatus for the Manufacture of Stabilized Milk products," now Patent No. 2,627,463, of February 3, 1953, and my co-pending application Serial Number 673,392, filed May 31, 1946, now abandoned.

I claim:

1. In a process for the manufacture of a non-hygroscopic food product from a liquid lacteal material containing substantial amounts of lactose, the steps of concentrating the material by evaporation to form a liquid concentrate, causing at least 50% of the lactose in the concentrate to crystallize as small solid particles of lactose monohydrate dispersed in the concentrate, and then atomizing the resulting material and suspending the same in a drying gas to effect rapid drying to form a powdered product without removal of water of crystallization or resolution of crystallized lactose, with crystallized lactose remaining as such in the atomized particles and during drying.

2. In a process for the manufacture of a substantially non-hygroscopic powdered food product from a liquid lacteal material containing substantial amounts of lactose, concentrating the material by vacuum evaporation to form a liquid concentrate, causing a major part of tne lactose content of the concentrate to be converted to the form of small crystals of lactose monohydrate dispersed in the concentrate, said last named step being carried out by cooling the concentrate together with agitation, and then atomizing the resulting material and suspending the same in a dry gas without removing water of crystallization or resolution of crystallized lactose, to effect rapid drying to form a powdered product, the crystallized lactose remaining as such during drying and in the atomized particles.

3. In a process for the manufacture of a substantially non-hygroscopic powdered product from a liquid lacteal material containing substantial amounts of lactose, the steps of concentrating the liquid material by rapid evaporation to produce a concentrate relatively free of lactose crystals and containing about 50 to 60% solids, causing about 70% or more of the lactose content of the concentrate to be converted to the form of small crystals of lactose monohydrate dispersed in the concentrate, said last named step being carried out by cooling the concentrate together with agitation, and then atomizing the resulting material and suspending the atomized particles in a dry gas to effect rapid drying to form a powdered product, the crystallized lactose remaining as such in the atomized particles and during drying.

4. In a process for the manufacture of a substantially non-hygroscopic powdered food product from a lacteal material containing substantial amounts of lactose, comprising concentrating the material by evaporation to produce a concentrate containing from 50% to 60% solids, causing the bulk of the lactose of the concentrate to be crystallized in the form of small crystals of lactose monohydrate, and then atomizing the resulting material and suspending the same in a drying gas to effect rapid drying to form a powdered product, the crystallized lactose remaining as such in the atomized particles and during drying, said drying serving to reduce the free moisture content to a value of the order of from 4 to 5%.

5. A process as in claim 1 in which the liquid material is raw liquid whey.

6. A process as in claim 1 in which the liquid material is skim milk.

7. A process as in claim 1 in which the liquid material is whole milk.

8. In a process for the manufacture of a substantially non-hygroscopic powdered product from a liquid lacteal material containing substantial amounts of lactose, the steps of concentrating the liquid material by rapid evaporation at a temperature between 110° to 150° F. to produce a concentrate relatively free of lactose crystals and containing about 50% to 60% solids, cooling the concentrate below the temperature of about 46° F. together with agitation thereby causing at least about 50% of the lactose content of the concentrate to be converted to the form of small crystals of lactose monohydrate dispersed in the concentrate, and then atomizing the resulting material and suspending the atomized particles in a dry gas to effect rapid drying to form a powdered product, the crystallized lactose remaining as such in the atomized particles and during drying.

REGINALD E. MEADE.

References Cited in the file of this patent

UNITED STATES PATENTS

| Number | Name | Date |
|---|---|---|
| 1,078,848 | Gray | Nov. 18, 1913 |
| 1,406,381 | Heath et al. | Feb. 14, 1922 |
| 1,956,811 | Sharp | May 1, 1934 |
| 2,088,606 | Peebles et al. | Aug. 3, 1937 |
| 2,188,506 | Hall | Jan. 30, 1940 |
| 2,314,159 | Peebles | Mar. 16, 1943 |

FOREIGN PATENTS

| Number | Country | Date |
|---|---|---|
| 317,166 | Great Britain | Aug. 15, 1929 |

OTHER REFERENCES

Hunziker, O. F.: "Condensed Milk and Milk Powder," 6th edition, published by the author La Grange, Ill., 1946, pages 164–171, 356–398, 401, 403, 409–415, 426–428, and 454.